United States Patent [19]

Wheeler

[11] 4,248,320
[45] Feb. 3, 1981

[54] AIR CUSHION VEHICLE FLEXIBLE SKIRTS

[75] Inventor: Raymond L. Wheeler, Cowes, England

[73] Assignee: British Hovercraft Corporation Limited, Yeovil, England

[21] Appl. No.: 50,609

[22] Filed: Jun. 21, 1979

Related U.S. Application Data

[63] Continuation-in-part of Ser. No. 840,860, Oct. 11, 1977, abandoned.

[51] Int. Cl.³ .................................................. B60V 1/16
[52] U.S. Cl. .................................. 180/128; 428/137; 428/272; 428/257; 156/313; 156/253
[58] Field of Search ..................... 180/128, 127, 116; 428/137, 272, 257, 245, 253, 254, 255, 267, 131, 133, 138; 244/100 R

[56] References Cited

U.S. PATENT DOCUMENTS

| 2,213,883 | 9/1940 | Lurie | 428/255 X |
| 2,461,240 | 2/1949 | Scruggs | 428/255 X |
| 3,558,412 | 1/1971 | Kurz | 428/253 X |
| 3,618,695 | 11/1971 | Wheeler | 180/128 |
| 3,901,988 | 8/1975 | Coles | 180/128 X |
| 4,056,645 | 11/1977 | Henry | 428/131 X |

Primary Examiner—John A. Pekar
Attorney, Agent, or Firm—Larson, Taylor and Hinds

[57] ABSTRACT

An apertured flexible sheet component for an air cushion vehicle flexible skirt, such as an apertured section of a flexible skirt bag member, comprises reinforced flexible sheet material including a reinforcing fabric having substantial spacings between groups of cords from which the fabric is formed. The reinforcing fabric is coated with elastomeric material and apertures are formed in the elastomeric material within the spacings between the groups of cords in the reinforcing fabric so that no broken cords are caused by formation of the apertures.

8 Claims, 4 Drawing Figures

AIR CUSHION VEHICLE FLEXIBLE SKIRTS

RELATED APPLICATIONS

This application is a continuation-in-part of Application Ser. No. 840,860 filed Oct. 11th, 1977, now abandoned.

BACKGROUND OF THE INVENTION

1. Field of the Invention

This invention relates to flexible skirts that are used to form at least a part of the cushion sealing means on air cushion vehicles.

Air cushion vehicles may be fully skirted or may be of the sidewall type in which cushion containment is effected by rigid sidewalls and bow and stern flexible skirts. Whilst the present invention is applicable to both types of vehicle it will generally be discussed and described in connection with the fully skirted type of vehicle.

2. Description of the Prior Art

One flexible skirt that has been developed and extensively used on operational air cushion vehicles is of a two-part configuration, the upper part of the skirt being formed as an inflatable bag member that is stiffened by being inflated, while the lower part of the skirt is formed by a plurality of adjacent and independent flexible skirt elements known in the art as "fingers." Two such flexible skirts are disclosed in the specification of U.S. Pat. Nos. 3,502,168 and 3,618,695. The bag member is manufactured from flexible impermeable sheet material and has two opposed edges fixed to the vehicle hard structure along fixing lines that are spaced apart so that the sheet material extends between them to enclose the outlet end of a peripherally extending duct leading from a plenum chamber formed by the vehicle hard structure. In operation, pressurized air is delivered to the plenum chamber and flows through the peripherally extending duct to inflate the bag member. The section of the bag member that faces the cushion area beneath the vehicle is apertured to permit some of the air to escape in a controlled manner from the bag member into the cushion area to build up and sustain the cushion of pressurized air on which the vehicle is supported above the surface over which it operates.

The total cross-section area of the cushion-feed apertures in the bag member is a significant factor in establishing a desired pressure ratio between the air inflating the bag member and the air forming the cushion, the pressure ratio dictating the stiffness of the bag member. A bag member having a large total aperture area will give a low bag-to-cushion air pressure ratio and will be relatively soft, whilst a bag member having a small total aperture area will give a high bag-to-cushion air pressure ratio and will be relatively stiff. However, the pressure drop between the bag member and the cushion represents a power loss. In redesigning the SR.N4 craft so as to increase its size and payload capacity it was a requirement that the skirt be redesigned so as, amongst other things, to reduce the bag-to-cushion pressure ratio from 1.5 to 1.2 and hence reduce the power loss associated with feeding the cushion through the bag member by about 75%. This requirement demanded cushion feed apertures covering at least 12.5% and preferably 20% of the available area of that section of the bag member which faces inwardly towards the cushion.

The flexible sheet material from which the bag member is manufactured normally comprises elastomeric coated plain woven nylon fabric and the serious loss of strength which results from the cutting of holes in elastomeric coated fabrics is a major problem in the design of flexible skirts. Numerous tests on coupon specimens under axial tension have shown that even a relatively small hole will degrade the strength to something of the order of 30 or 40% of the basic strength of the material in the net section in way of the hole. Whilst the stress concentration factors implied by such results are very similar to those which can be calculated for conventional engineering materials, local yielding of ductile metal will normally result in a redistribution of load and the full effects of stress concentration only become apparent in fatigue. In contrast elastomeric coated fabrics, despite their high elongation under load, behave like brittle materials and catastrophic failure occurs as soon as the stress in the first continuous cord bounding a cushion-feed aperture reaches the ultimate tensile strength of that cord. This is because when the first continuous thread fails, its load has to be carried by the next adjacent continuous cord, which being overloaded also fails so that a self-propagating tear develops which will, in a short time, run the length of the bag member. It was apparent from the initial designa stage that the requirement for increased cushion-feed aperture area could not be met using elastomeric coated plain woven nylon fabric whilst at the same time producing a bag member with the necessary structural integrity.

OBJECTS OF THE INVENTION

It is an object of the present invention to improve the structural integrity of apertured flexible sheet components for air cushion vehicle flexible skirts.

It is another object of the invention to provide a bag member for use in forming at least a part of an air cushion vehicle flexible skirt, in which communication between the interior of the bag member and the vehicle supporting air cushion is provided by an apertured section of the bag member whereby the structural integrity of the bag member is not substantially impaired.

The aforementioned objects of the invention may be met by forming an apertured flexible sheet component such as the apertured section of a bag member, from reinforced flexible sheet material including a reinforcing fabric having substantial spacings between groups of warp and weft cords and elastomeric material surrounding the cords and embedded in the interstices between the cords with apertures formed in the elastomeric material within the spacings between the groups of cords in said reinforcing fabric whereby no broken cords are caused by formation of the apertures and wherein there are from 2 to 10 cords per group with said groups of warp and weft cords being interwoven where they cross each other, and said apertures are spaced from each other at a pitch centre dimension that is at least 50% larger than the width dimension of each said aperture.

Preferably each said aperture is circular.

The fabric material may be a mock leno fabric.

Advantageously the width dimension of each cushion-feed aperture is from 1 to 5 times the thickness dimension of the reinforced flexible sheet material.

A further object of the invention is to provide a method of manufacturing an apertured flexible sheet component for an air cushion vehicle flexible skirt, such as the apertured section of a skirt bag member, wherein apertures are formed in elastomeric material within spacings between groups of warp and weft cords in a reinforcing fabric either by exclusion of elastomeric material during manufacture of the flexible sheet from which the component is formed, or by cutting away elastomeric material after manufacture of the sheet, whereby no broken cords are caused by formation of the apertures.

The present invention substantially reduces the stress concentration around a cushion-feed aperture of a skirt bag member formed from elastomeric coated fabric, and permits manufacture of a bag member having a high cushion-feed aperture area that will withstand operational loading without early failure of those cords in the fabric that bound the cushion-feed apertures. This permits use of the two-stage bag and finger skirt at lower bag-to-cushion pressure ratios, thereby reducing the power loss that is associated with the pressure drop between the bag member and the cushion without impairing the structural integrity of the bag member.

BRIEF DESCRIPTION OF THE DRAWINGS

The invention will now be described, by way of example, with reference to the accompanying drawings, in which.

DETAILED DESCRIPTION OF THE INVENTION

Figure 1:
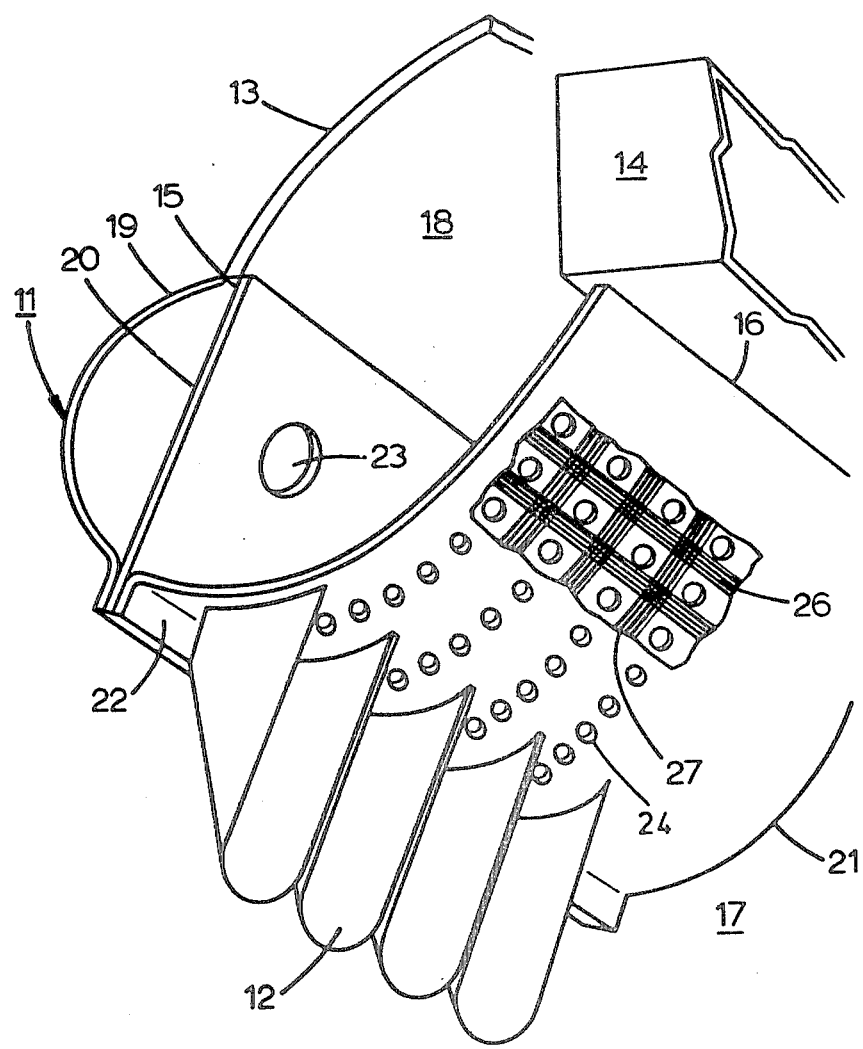
FIG. 1 is a perspective view of a two-stage bag and finger skirt, the bag member having an apertured section manufactured in accordance with the present invention.

The cushion sealing means on an air cushion vehicle (not shown in full) comprises a two-stage flexible skirt having an upper portion formed by an inflatable bag member 11 and a lower portion formed by a plurality of side-by-side independent flexible skirt elements 12 of the type known in the art as fingers. The bag member 11 is attached to vehicle hard structure 13 and 14 along fixing lines 15 and 16 that are spaced apart, the fixing line 15 being situated outboard of the fixing line 16 with respect to the vehicle cushion area 17. The hard structure 13 and 14 defines the outlet end 18 of a duct leading from a lift fan (not shown) that supplies a flow of pressurized air through the duct to inflate the bag member 11.

The segment of the bag member 11 illustrated in FIG. 1 is formed from three sheets of flexible material, 19, 20 and 21, respectively. The sheet 19 has an upper edge attached along fixing line 15 to the rigid structure 13 by hinged fastening means (not shown) such as are disclosed in U.S. Pat. No. 3,244,248, and when inflated depends first outwardly and downwardly and then downwardly and inwardly to have its lower edge portion attached to the lower edge portions of the sheets 20 and 21 so as to form an apron 22 to which the upper outermost parts of the fingers 12 are attached by suitable fixing means such as bolting (not shown). The upper edge of the sheet 20 is similarly attached to the structure 13 near to the fixing line 15, and depends downwardly to have its lower edge attached to the lower edges of the sheets 19 and 21 forming the apron 22. The sheet 20 stiffens the bag member 11 by acting as an anti-vibration web which prevents excessive vertical oscillation of the bag member 11. The sheet 20 is provided with holes 23 to permit air to pass to the space enclosed between it and the sheet 19. The holes 23 may be provided with flexible flaps (not shown) that permit air to flow into the space enclosed by the sheets 19 and 20 but prevent air from flowing out of this space by way of the holes 23.

The sheet 21 is of apertured construction, and is attached at its upper edge to the rigid structure 14 along a fixing line 16 by hinged fastening means (not shown) such as are shown in U.S. Pat. No. 3,244,248, and depends downwardly and outwardly to have its lower edge portion joined to the sheets 19 and 20 at the apron 22. The sheet 21 is provided with a plurality of cushion-feed apertures in the form of holes 24 which provide communication between the interior of the bag member 11 and the cushion area 17. In operation of the vehicle pressurized air supplied from the lift fan (not shown) enters the bag member from the outlet end 18 of the duct leading from the lift fan and inflates the bag member to the configuration shown in FIG. 1. Some of this inflation air passes from the bag member by way of the holes 24 to build up and sustain the cushion in the cushion area 17 and to inflate the fingers 12.

Figure 2:
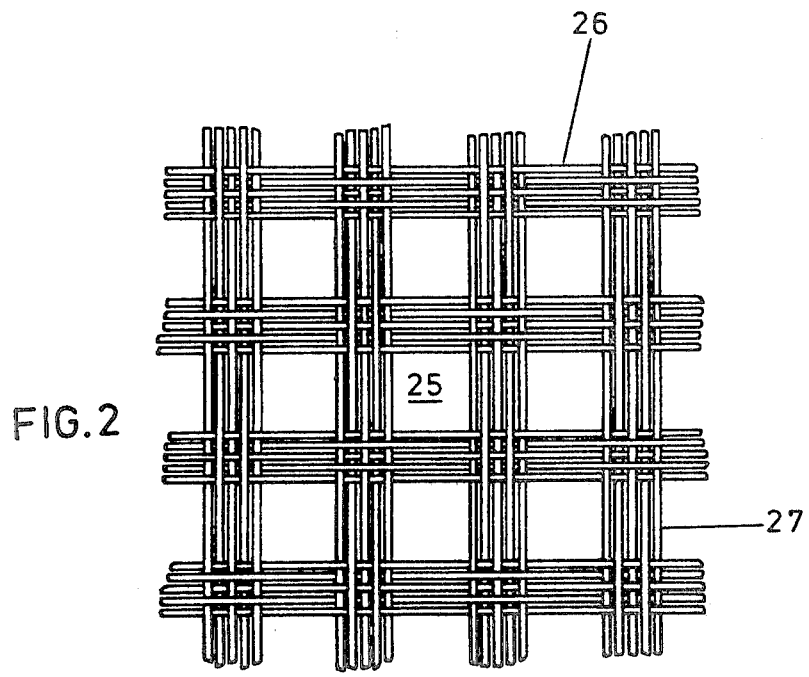
FIG. 2 shows part of a sheet of woven fabric suitable for use in reinforcing the apertured section of the bag member shown in FIG. 1.

The bag member 11 is designed to operate at an inflation pressure of 1.2 times the vehicle cushion pressure, and in order to provide the large number of holes 24 in the sheet 21 without detracting from the structural integrity of the bag member, the sheet 21 is manufactured from flexible impermeable reinforced sheet material including a reinforcing fabric, for example a mock leno weave such as is shown in FIG. 2, having substantial spacings 25 between groups of warp and weft cords 26 and 27, respectively. The cords are embedded in an elastomeric material such as neoprene, and the holes 24 are formed in the elastomeric material within the spacings 25 between the groups of warp 26 and weft 27 cords whereby no broken cords are caused by formation of the holes 24. In FIG. 1, the elastomeric material over part of the area of the sheet 21 is shown broken away, in order to reveal the groups of warp 26 and weft 27 cords of the reinforcing fabric.

In order to overcome the stress concentration and serious loss of strength that results from cutting holes in prior art elastomeric coated plain woven fabrics, I have discovered that the size of the cords bounding the cushion-feed apertures should be increased in comparison with the size of the cords in the prior art plain woven fabric, and there should be no broken cords at the positions of the cushion-feed apertures, so that the reinforcing fabric is able to carry the skirt design loads without failure of the individual cords bounding the cushion-feed apertures. By increasing the size of the cords it is possible to provide more plies per cord and more yarns (threads) per ply than was the case with prior art plain woven fabrics, and because there has to be failure of each individual thread in a cord bounding a cushion-feed aperture before that cord fails in fatigue, the fatigue life of the reinforcing material is enhanced. I have discovered that there should be from two (2) to ten (10) cords per group of warp and weft threads, these limits being dictated principally by the need to interweave the groups of warp and weft cords where they cross in order to provide a stable reinforcing fabric.

It is important that the cords should not be bent or distorted over those lengths which bound the cushion-feed apertures because when the skirt is loaded a bent or distorted cord will straighten and, in so doing, will generate a high stress concentration at the cord to elastomer interface, giving rise to failure of the bond between the cord and elastomer coating. This will very quickly result in delamination of the material around the hole.

The lowest bag-to-cushion pressure ratio is obtained by forming a cushion-feed aperture in the elastomeric material within each of the spacings between the groups of warp and weft threads in the reinforcing fabric. In this case the cushion-feed apertures are spaced from each other by a pitch centre dimension that is not less than fifty percent larger than the width dimension of an aperture. It will be appreciated, however, that should a bag-to-cushion pressure ratio be required which is above the lowest value then this can be obtained by omitting to form cushion-feed apertures in the elastomeric material within some of the spacings. Thus in the illustrated embodiment, where the bag member is designed to operate at a bag-to-cushion pressure ratio of 1.2, the diameter of a cushion-feed aperture, i.e. the hole 24, is 0.32 inch, and a hole 24 is formed at each of the spacings between the groups of warp 26 and weft 27 threads. There are five cords in each group of warp 26 and weft 27 cords, the diameter of each cord being 0.062 inch.

Increasing the thickness of the reinforcing fabric and decreasing the size of the cushion-feed aperture also gives rise to an advantageous increase in the ratio of the material thickness to cushion-feed aperture size, resulting in reduced losses across a cushion-feed aperture and improved volume flow as compared with current skirt practice. Thus, a mock leno specimen incorporating a multiplicity of 0.32 inch diameter holes, as proposed for the redesigned SR.N4 skirt bag member, gave an eleven percent increase in the volume flow for a nominal hole area and pressure drop than that through a three inch diameter hole representative of current skirt practice. In designing flexible skirts incorporating my invention it will be found advantageous to make the width dimension of the cushion-feed apertures in the range of from 1 to 5 times the thickness of the reinforced flexible sheet material.

Figure 3:
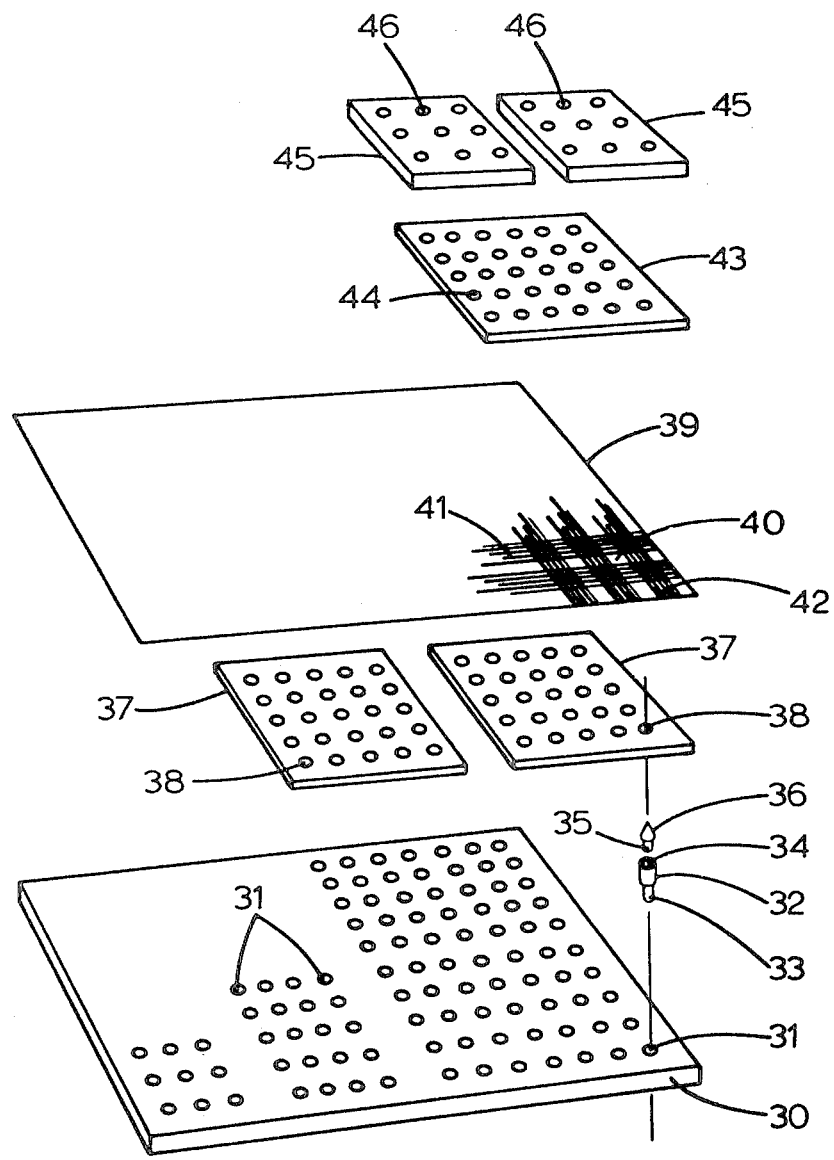
FIG. 3 is an exploded view illustrating one method of manufacturing an apertured flexible sheet component such as may be used to form the apertured section of the bag member shown in FIG. 1.

One method of manufacturing an apertured flexible sheet component such as the sheet 21 for the bag member 11 of the flexible skirt shown in FIG. 1, will now be described with reference to FIG. 3. A light alloy plate 30 is provided with a plurality of holes 31 spaced from each other at the same pitch spacings as are required between the apertures in the flexible sheet which is to be manufactured. A peg member 32 is located in each hole 31 by a reduced diameter end portion 33. The protruding end face of the peg member 32 is provided with a hole 34 that locates a spigot portion 35 of a cone-shaped member 36. Sheets of elastomeric material 37, for example neoprene, are punched so as to contain a plurality of holes 38 of the required diameter and at the necessary pitch spacings, and these sheets 37 are then located on the peg members 38, using the cone-shaped members 36 as guides, so as to lie flat on the plate member 30 and abut each other at their edges. Next, a layer of mock leno fabric 39, such as is shown in FIG. 2 of the accompanying drawings, that has been pretreated for rubber receptiveness, is located over the peg members 32 so that the peg members pass through spacings 40 between groups of warp and weft cords 41 and 42, respectively. For ease of illustration, the spacings 40 have been illustrated in one corner only of the layer of mock leno fabric 39 shown in FIG. 3. Next, further sheets of elastomeric material 43 of similar dimensions to the sheets 37 and blanked with holes 44 are located on the peg members so as to lie on top of the layer of mock leno fabric 39. Light alloy pressure plates 45 having holes 46 are then located on the peg members 32 so as to abut each other and completely cover the upper surface of the elastomeric sheets 43. The cone-shaped members 36 are removed from the peg members 32 before the complete assembly is placed in a heated press, or an auto-clave, and subjected to heat and pressure so as to effect curing of the elastomeric material. During the curing process the elastomeric material flows into the interstices between the cords of the mock leno fabric so as to form a homogeneous sheet, but is prevented from flowing into those areas of the spacings 40 between the groups of warp 41 and weft 42 cords that are taken up by the peg members 32. Thus after curing, when the peg members 32 are removed, there is presented a sheet of fabric reinforced flexible material having the required holes formed therein so that there is no necessity to cut the material.

Figure 4:
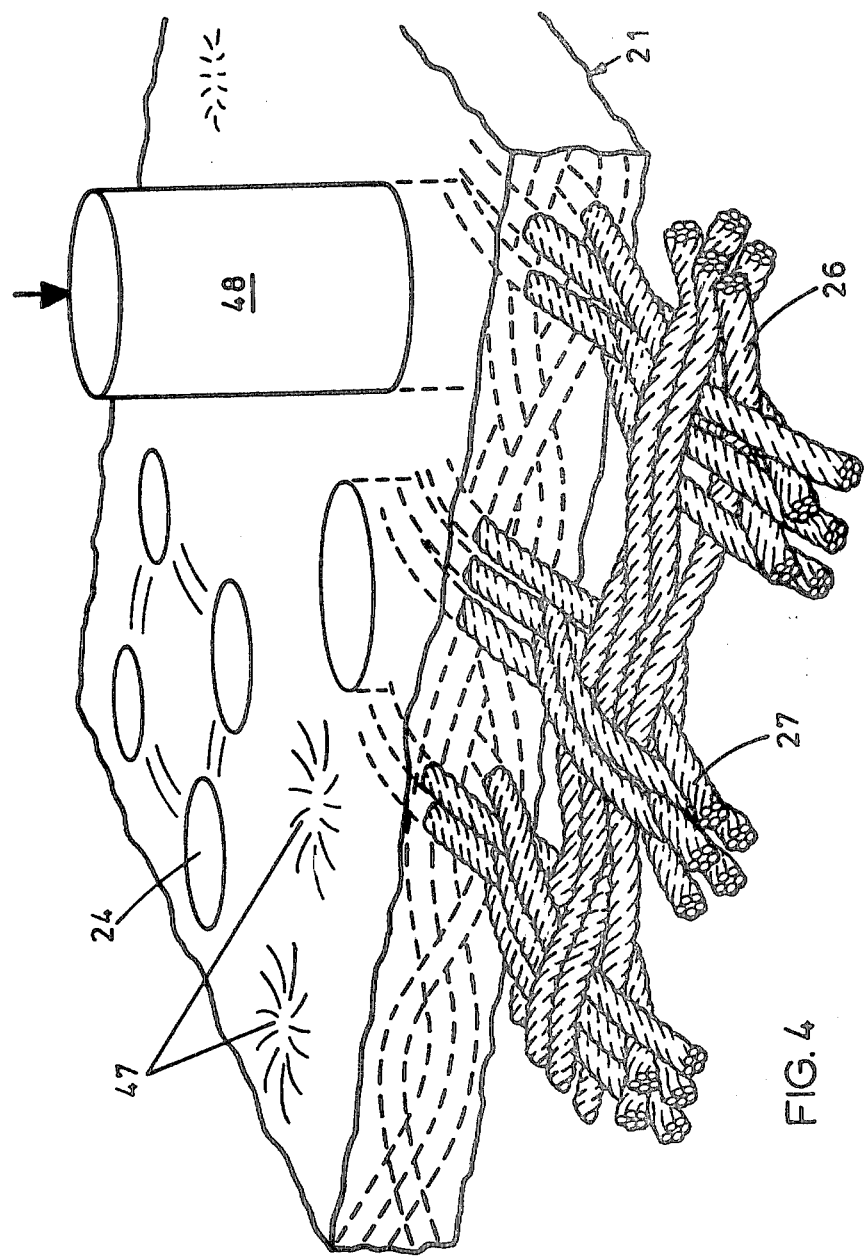
FIG. 4 is a fragmentary perspective view of part of a semi-finished apertured flexible sheet component such as may be used to form the apertured section of the bag member shown in FIG. 1, and illustrates another method of manufacture.

Another method of manufacturing the sheet 21 comprises locating a layer of mock leno fabric, such as is shown in FIG. 2 of the accompanying drawings, and which has been pretreated for rubber receptiveness, between two layers of elastomeric sheet material, for example uncured neoprene sheet, and subjecting the assembly to heat and pressure so as to effect curing of the neoprene. During curing the neoprene flows into the spacings 25 between the groups of warp 26 and weft 27 cords as well as into the interstices between the cords, and forms a homogeneous sheet of reinforced flexible impermeable material. In the cured sheet, the locations of the spacings 25 are revealed by indentations 47 where the neoprene has flowed into the spacings 25, as can be see in in FIG. 4. At these locations neoprene is removed using a punch 48 of appropriate diameter so that the cushion-feed holes 24 are formed in the sheet 21, without breaking any of the warp 26 and weft 27 cords.

Of course the embodiments of the invention hereinbefore described with reference to and shown in the accompanying drawings are by way of example only, and various modifications may be effected without departing from the scope of the invention. For example, a bag member may be manufactured by bolting together in end to end relationship a number of panels of flexible material that are continuous between their lines of attachment to the hard structure of the vehicle, each panel having cushion-feed apertures only over that area which faces the vehicle cushion and the spacings between the warp and weft cords in the reinforcing fabric over the remainder of the panel being filled with elastomeric material. Furthermore, the invention may be applied to the manufacture of the anti-vibration web of the bag member so that holes are not cut in this web but are preformed during manufacture.

What is claimed is:

1. An apertured flexible sheet component for an air cushion vehicle flexible skirt comprising a flexible impermeable reinforced sheet having a plurality of apertures therein, said flexible impermeable reinforced sheet including a reinforcing fabric having substantial spacings between groups of warp and weft cords and elastomeric material surrounding the cords and embedded in the interstices between the cords with said apertures formed in the elastomeric material within the spacings between the groups of cords in said reinforcing fabric whereby no broken cords are caused by the formation of apertures in said sheet material and wherein there are from 2 to 10 cords per group with said groups of warp and weft threads being interwoven where they cross each other, and said apertures are spaced from each other at a pitch centre dimension that is at least 50% larger than the width dimension of each said aperture.

2. An apertured flexible sheet component for an air cushion vehicle flexible skirt according to claim 1, wherein the width dimension of each said aperture is from 1 to 5 times the thickness dimension of said flexible impermeable reinforced sheet.

3. An inflatable bag member for use in forming at least a part of the cushion sealing means of an air cushion vehicle, said bag member having an apertured section providing communication between the interior of said bag member and the vehicle air cushion, said apertured section comprising a flexible impermeable reinforced sheet having a plurality of apertures therein, said flexible impermeable reinforced sheet including a reinforcing fabric having substantial spacings between groups of warp and weft cords and elastomeric material surrounding the cords and embedded in the interstices between the cords with said apertures formed in the impermeable material within the spacings between the groups of cords in said reinforcing fabric whereby no broken cords are caused by the formation of apertures in said sheet and wherein there are from 2 to 10 cords per group with said groups of warp and weft cords being interwoven where they cross each other, and said apertures are spaced from each other at a pitch centre dimension that is at least 50% larger than the width dimension of each said aperture.

4. An inflatable bag member according to claim 3, wherein the width dimension of each said aperture is from 1 to 5 times the thickness dimension of said flexible impermeable reinforced sheet.

5. An inflatable bag member according to claim 3, wherein said reinforcing fabric comprises a mock leno fabric.

6. An inflatable bag member according to claim 3, wherein said elastomeric material comprises rubber.

7. An air cushion vehicle having cushion containing means including a flexible skirt comprising an inflatable bag member, said bag member comprising flexible impermeable sheet having fabric reinforcing therein, said bag member being attached to vehicle hard structure along spaced fixing lines, one of said fixing lines being disposed outboard with respect the vehicle cushion area, a portion of said bag member extending downwardly from the inner fixing line being apertured whereby the space enclosed by the bag member and the vehicle hard structure is in communication with the vehicle cushion area, said fabric in said portion of the bag member having substantial spacings between groups of warp and weft cords and elastomeric material surrounding the groups of cords and embedded in the interstices therebetween, the apertures formed in the elastomeric material within the spacings between the groups of warp and weft cords so that the continuity of the warp and weft cords surrounding the aperture is maintained and wherein there are from 2 to 10 cords per group with said groups of warp and weft threads being interwoven where they cross each other, and said apertures are spaced from each other at a pitch centre dimension that is at least 50% larger than the width dimension of each said aperture.

8. An air cushion vehicle according to claim 6, wherein each said aperture has a width dimension that is from 1 to 5 times the thickness dimension of said flexible impermeable reinforced sheet.

* * * * *

UNITED STATES PATENT AND TRADEMARK OFFICE
CERTIFICATE OF CORRECTION

PATENT NO. : 4,248,320

DATED : February 3, 1981

INVENTOR(S) : Raymond L. Wheeler

It is certified that error appears in the above—identified patent and that said Letters Patent is hereby corrected as shown below:

On the cover sheet Insert:

-- (30) Foreign Application Priority Data

October 13, 1976     United Kingdom     42,628/76 --.

Signed and Sealed this

Twenty-first Day of July 1981

[SEAL]

Attest:

GERALD J. MOSSINGHOFF

Attesting Officer     Commissioner of Patents and Trademarks